US009777111B2

(12) United States Patent
Colhoun et al.

(10) Patent No.: US 9,777,111 B2
(45) Date of Patent: Oct. 3, 2017

(54) PET POLYMER WITH IMPROVED PROPERTIES

(75) Inventors: Frederick Leslie Colhoun, Kingsport, TN (US); Perry Michael Murdaugh, Sr., Lexington, SC (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 348 days.

(21) Appl. No.: 11/254,407

(22) Filed: Oct. 20, 2005

(65) Prior Publication Data

US 2007/0092672 A1  Apr. 26, 2007

(51) Int. Cl.
*C08G 63/78* (2006.01)
*C08G 63/183* (2006.01)
*C08L 67/02* (2006.01)

(52) U.S. Cl.
CPC .......... *C08G 63/183* (2013.01); *C08L 67/02* (2013.01); *C08L 67/025* (2013.01); *Y10T 428/1352* (2015.01)

(58) Field of Classification Search
USPC .......... 428/34.1, 480, 35.7, 402, 34.3, 34.2; 524/111, 386, 186; 264/523, 225, 540, 264/524; 525/444; 11/34.1
See application file for complete search history.

(56) References Cited

U.S. PATENT DOCUMENTS

| | | | |
|---|---|---|---|
| 4,340,721 A | 7/1982 | Bonnebat et al. | |
| 4,579,936 A | 4/1986 | O'Neill | |
| 5,281,387 A | 1/1994 | Collette et al. | |
| 5,302,686 A | 4/1994 | Tanaka et al. | |
| 5,409,983 A | 4/1995 | Jones et al. | |
| 5,596,068 A | 1/1997 | Kramer et al. | |
| 5,601,780 A | 2/1997 | Occhiello et al. | |
| 5,686,553 A | 11/1997 | Tai et al. | |
| 5,728,347 A | 3/1998 | Collette et al. | |
| 5,856,424 A | 1/1999 | Bowers et al. | |
| 5,888,598 A | 3/1999 | Brewster et al. | |
| 5,925,710 A | 7/1999 | Wu et al. | |
| 6,060,140 A | 5/2000 | Sprayberry et al. | |
| 6,284,866 B1 * | 9/2001 | Schiavone ............ | C08G 63/80 428/35.7 |
| 6,309,718 B1 | 10/2001 | Sprayberry | |
| 6,372,318 B1 | 4/2002 | Collette et al. | |
| 6,506,853 B2 | 1/2003 | Duan | |
| 6,706,396 B1 | 3/2004 | Hayes et al. | |
| 6,740,377 B2 | 5/2004 | Pecorini et al. | |
| 2001/0027244 A1 | 10/2001 | Branum | |
| 2001/0034431 A1 | 10/2001 | Schiavone | |
| 2002/0010309 A1 * | 1/2002 | Oguro et al. .......... | 528/272 |
| 2003/0186006 A1 | 10/2003 | Schmidt et al. | |
| 2003/0205852 A1 * | 11/2003 | Porter ..................... | 264/544 |
| 2004/0086733 A1 * | 5/2004 | Fujimori et al. ....... | 428/480 |
| 2004/0091651 A1 | 5/2004 | Rule et al. | |
| 2004/0236063 A1 | 11/2004 | Suzuki et al. | |
| 2005/0196566 A1 | 9/2005 | Colhoun et al. | |
| 2007/0066735 A1 * | 3/2007 | Quillen et al. ......... | 524/404 |

FOREIGN PATENT DOCUMENTS

| | | |
|---|---|---|
| EP | 0 411 136 A1 | 2/1991 |
| EP | 0 484 105 A2 | 5/1992 |
| EP | 0 745 629 A2 | 12/1996 |
| JP | 7330915 | 12/1995 |
| JP | 2004-189975 A | 7/2004 |

OTHER PUBLICATIONS

European Office Action issued Jun. 28, 2011 in connection with corresponding European Application No. 06 816 7436, filed Oct. 11, 2006.
European Office Action issued Jul. 6, 2011 in connection with corresponding European Application No. 10 002 3142, filed Oct. 11, 2006.
Office Action issued Oct. 8, 2013 in European Patent Application No. 06816743.6.
Invitation pursuant to Article 94(3) and Rule 71(1) EPC issued Feb. 17, 2014 in European Patent Application No. 06 816 743.6.
Office Action issued May 15, 2012, in European Patent Application No. 06 816 743.6, filed Oct. 11, 2006 (with English-language Translation).

* cited by examiner

*Primary Examiner* — Ellen S Wood
(74) *Attorney, Agent, or Firm* — Oblon, McClelland, Maier & Neustadt, L.L.P.

(57) ABSTRACT

Polyester compositions having desirable injection molding properties and that retain good crystallization rates and natural stretch ratio characteristics are described. These polyesters are suitable for the manufacture of beverage containers, bulk continuous filaments, and other articles that can benefit from such improved properties.

31 Claims, No Drawings

PET POLYMER WITH IMPROVED PROPERTIES

FIELD OF THE INVENTION

The present invention is directed to certain polyesters having desirable injection molding properties while retaining good crystallization rates and natural stretch ratio characteristics. These polyesters may be advantageously used, for example, in water applications, for instance, for the manufacture of beverage containers. These polyesters can also be used in the manufacture of bulk continuous filaments, and other articles that can benefit from such properties.

BACKGROUND

Poly(ethylene terephthalate) copolymers, commonly referred to as PET polymers, are widely used in the manufacture of light weight containers for carbonated and non-carbonated drinks, juice, water, jellies, marmalades, and other similar foodstuffs. Packages made by stretch blow molding of PET polymers possess excellent mechanical properties, such as high strength and shatter resistance, as well as good gas barrier properties.

Typically, to form plastic containers, the PET polymer is extruded and formed into chips or pellets. The pellets are then melted and used to make a container preform by injection molding. The preform is subsequently reheated and stretched-blown into a mold, which provides the final shape of the container. The stretch blow molding step causes biaxial orientation of the polyester to occur at least in some parts of the container and provides strength to the container so that it can resist deformation from internal pressure during use and can adequately contain the fluid.

There are three key characteristics of PET polymers that are relevant to making containers by stretch blow molding, namely, their natural stretch ratio, their crystallization rate, and the rate at which they fill injection molds.

The natural stretch ratio is an inherent property of a polymer and is a measure of how much the preform can stretch to take the shape of the final article. In the present Examples, the free blow volume of a given polymer is used as a measure of the natural stretch ratio of that polymer. The natural stretch ratio of a polymer influences the design of the preform by determining its stretch ratio limitations. Due to the high cost of injection mold tooling, new PET resins that perform well with existing preform designs can be used. Resins with very low natural stretch ratios generally create processing problems during stretch blow molding, while resins with very high natural stretch ratios generally yield containers with poor physical properties if used in conjunction with preform and bottle tooling.

The rate of crystallization of a PET polymer can influence the clarity or transparency of the final article. Therefore, controlling the rate of crystallization becomes relevant especially when the application requires clear or transparent products. Thermally induced crystallization tends to form large crystallites in the polymer, resulting in haze. In order to minimize the formation of crystallites and thus have clear preforms, the rate of thermal crystallization needs to be slow enough so that preforms with little or no crystallinity can be produced. However, if the rate of thermal crystallization is too low, the production rates of PET resin using solid state polymerization can be adversely affected because PET needs to be crystallized prior to solid-state polymerization.

The rate at which a polymer fills an injection mold is directly related to its intrinsic viscosity. A lower viscosity resin is generally desired because it will fill the injection mold more easily, leading to a reduction in injection molding cycle time and an increase in product output. Also, a lower viscosity resin will reduce the injection pressure required to fill the mold in a given time, reducing the wear and tear on the injection molding machine. Therefore, manufacturing costs may be reduced for resins with a lower intrinsic viscosity.

Unfortunately, improving one of these three properties—natural stretch ratio, crystallization rate, or fill injection rate—has normally resulted in detriment to one or both of the remaining properties. For example, compositions with suitably slow crystallization rates often require a higher intrinsic viscosity to maintain an adequate natural stretch ratio, which adversely impacts the fill time in injection molding.

BRIEF DESCRIPTION OF THE INVENTION

We have discovered a polyester composition having desirable injection molding properties while retaining good crystallization rates and natural stretch ratio characteristics.

In one embodiment, the present invention provides a polyester comprising:
  i) a carboxylic acid component comprising at least 90 mol % terephthalic acid residues and from 0 to 10 mol % of carboxylic acid comonomer residues;
  ii) a hydroxyl component comprising at least 90 mol % ethylene glycol residues and additional hydroxyl residues in an amount up to 10 mol %; wherein the additional hydroxyl residues are chosen from a) diethylene glycol residues and b) mixtures of diethylene glycol residues and hydroxyl comonomer residues;
based on 100 mol % of carboxylic acid component residues and 100 mol % of hydroxyl component residues in the polyester; wherein at least one of the carboxylic acid and hydroxyl components comprises comonomer residues, the molar ratio of the total comonomer residues to diethylene glycol residues being 1.3:1.0 or greater; and wherein the polyester comprises less than 2.3 mol % of diethylene glycol and has an intrinsic viscosity greater than 0.40 dL/g and less than 0.77 dL/g.

In another embodiment, the present invention provides a polyester comprising:
  i) a carboxylic acid component comprising 100 mol % terephthalic acid residues;
  ii) a hydroxyl component comprising at least 90 mol % ethylene glycol residues and additional hydroxyl residues in an amount up to 10 mol %; wherein the additional hydroxyl residues are diethylene glycol residues and hydroxyl comonomer residues;
based on 100 mol % of carboxylic acid component residues and 100 mol % of hydroxyl component residues in the polyester; wherein the molar ratio of the hydroxyl comonomer residues to diethylene glycol residues is 1.3:1.0 or greater; and wherein the polyester comprises less than 2.3 mol % of diethylene glycol and has an intrinsic viscosity greater than 0.40 dL/g and less than 0.80 dL/g.

In another embodiment, the present invention provides a polyester comprising:
  i) a carboxylic acid component comprising at least 90 mol % terephthalic acid residues and from 0 to 10 mol % of carboxylic acid comonomer residues;

ii) a hydroxyl component comprising at least 90 mol % ethylene glycol residues and the remainder diethylene glycol residues;

based on 100 mol % of carboxylic acid component residues and 100 mol % of hydroxyl component residues in the polyester; wherein the molar ratio of the carboxylic acid comonomer residues to diethylene glycol residues is 1.3:1.0 or greater; and wherein the polyester comprises less than 2.3 mol % of diethylene glycol and has an intrinsic viscosity greater than 0.40 dL/g and less than 0.77 dL/g. In another embodiment, the hydroxyl component comprises at least 98.4 mol % ethylene glycol residues and 1.6 mol % or less of diethylene glycol residues. In other embodiments, the hydroxyl component comprises from 0.5 to 2.3 mol % of diethylene glycol residues, or from 0.5 to 1.6 mol % of diethylene glycol residues.

In another embodiment, the present invention provides a polyester wherein the carboxylic acid comonomer is chosen from phthalic acid, isophthalic acid, ($C_1$-$C_4$) dialkyl esters of isophthalic acid, naphthalene-2,6-dicarboxylic acid, ($C_1$-$C_4$) dialkyl esters of naphthalene 2-6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid; or wherein the hydroxyl comonomer is chosen from triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2,5-ethylhexanediol-(1,3), 2,2-diethyl propane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

In another embodiment, the carboxylic acid component of the polyesters of the invention comprises from 1 to 10 mol % of carboxylic acid comonomer. The polyesters can also comprise from 3 to 10 mol % of carboxylic acid comonomer or from 5 to 10 mol % of carboxylic acid comonomer. In another embodiment, the hydroxyl component of the polyesters of the invention comprises from 1 to 10 mol % of additional hydroxyl residues. The polyesters can also comprise from 3 to 10 mol % of additional hydroxyl residues or from 5 to 10 mol % of additional hydroxyl residues.

In another embodiment, the polyesters of the invention comprise less than 2.0 mol % of diethylene glycol. In yet another embodiment, the polyesters of the invention comprise less than 1.6 mol % of diethylene glycol.

In another embodiment, the molar ratio of the total comonomer residues to diethylene glycol residues in the polyesters of the invention is 1.5:1.0 or greater.

In another embodiment, the intrinsic viscosity of the polyesters of the invention is less than 0.79 dL/g. For example, the intrinsic viscosity of the polyester particles can be less than 0.78 dL/g, or less than 0.77 dL/g, and even less than 0.76 dL/g.

Optionally, the polyesters of the invention contain less than 2 ppm residual acetaldehyde (as measured by the French National Standard Test). In another embodiment, the polyesters contain less than 1 ppm residual acetaldehyde.

The polyesters of the invention can be made from virgin raw materials or from recycled polyester polymers. In one embodiment of the invention, the polyester is prepared from 75 wt % or greater virgin raw materials.

The polyesters of the invention can be made by a number of processes well known in the art. For example, the polyester polymer can be produced by melt polymerization, optionally followed by solid-state polymerization. Also, the polyester can either be crystallized before or after the formation of pellets.

In one embodiment, the polyester polymer can be produced by melt polymerization to a molecular weight suitable for container applications, for example, with an intrinsic viscosity greater than 0.65 dL/g, then formed into particles, such as pellets, and crystallized. If desired, the polyesters can also undergo the removal of most of the residual acetaldehyde.

The polyesters of the invention can be used to manufacture containers (e.g., bottles), sheets, films, trays, rods, tubes, lids, filaments and fibers and other packaging items. In one embodiment, the polyester polymers of the invention are used to make uncarbonated water containers.

DEFINITIONS

Throughout the specification and claims, including the detailed description below, the following definitions apply.

As used in the specification and the appended claims, the singular forms "a", "an", and "the" include plural referents unless the context clearly dictates otherwise. For example, reference to processing or making a polymer, a preform, an article, a container, or a bottle is intended to include the processing or making of singular and a plurality of polymers, preforms, articles, containers or bottles. References to a composition containing "an" ingredient or "a" polymer is intended to include other ingredients or other polymers, respectively, in addition to the one named. It should also be noted that the term "or" is generally employed in its sense including "and/or" unless the content clearly dictates otherwise.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

The term residue as used herein, refers to the portion of a compound that is incorporated into a polyester during polycondensation.

The term carboxylic acid component as used herein, refers to all carboxylic acid residues of a polyester.

The term hydroxyl component as used herein, refers to all hydroxyl residues of a polyester.

The term carboxylic acid comonomer residue as used herein, refers to any carboxylic acid residue, other than terephthalic acid residues.

The term hydroxyl comonomer residue as used herein, refers to any hydroxyl residue, other than ethylene glycol residues and diethylene glycol residues.

The term total comonomer residues as used herein, refers to the sum of carboxylic acid comonomer residues and hydroxyl comonomer residues.

The intrinsic viscosity values described throughout this application are set forth in dL/g units as calculated from the inherent viscosity measured at 25° C. in a 60/40 wt/wt mixture of phenol/tetrachloroethane. The intrinsic viscosity of the polyester is determined by the method described in U.S. Application Publication No. 2005/0196566, which is hereby incorporated by reference.

Other than in the operating examples, or where otherwise indicated, all numbers expressing quantities used in the specification and claims are to be understood as being modified in all instances by the term "about." Accordingly, unless indicated to the contrary, the numerical parameters set forth in the present specification and attached claims are approximations that may vary depending upon the desired properties sought to be obtained by the present invention. It should be understood that the exact numerical values disclosed also form embodiments of the invention. At the very least, and not as an attempt to limit the application of the doctrine of equivalents to the scope of the claims, each numerical parameter should be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

DETAILED DESCRIPTION OF THE INVENTION

The present invention is directed to certain polyesters having desirable injection molding properties while retaining good crystallization rates and natural stretch ratio characteristics.

In one embodiment, the present invention provides a polyester comprising:
 i) a carboxylic acid component comprising at least 90 mol % terephthalic acid residues and from 0 to 10 mol % of carboxylic acid comonomer residues;
 ii) a hydroxyl component comprising at least 90 mol % ethylene glycol residues and additional hydroxyl residues in an amount up to 10 mol %; wherein the additional hydroxyl residues are chosen from a) diethylene glycol residues and b) mixtures of diethylene glycol residues and hydroxyl comonomer residues;
based on 100 mol % of carboxylic acid component residues and 100 mol % of hydroxyl component residues in the polyester; wherein at least one of the carboxylic acid and hydroxyl components comprises comonomer residues, the molar ratio of the total comonomer residues to diethylene glycol residues being 1.3:1.0 or greater; and wherein the polyester comprises less than 2.3 mol % of diethylene glycol and has an intrinsic viscosity greater than 0.40 dL/g and than less 0.77 dL/g.

In another embodiment, the present invention provides a polyester comprising:
 i) a carboxylic acid component comprising 100 mol % terephthalic acid residues;
 ii) a hydroxyl component comprising at least 90 mol % ethylene glycol residues and additional hydroxyl residues in an amount up to 10 mol %; wherein the additional hydroxyl residues are diethylene glycol residues and hydroxyl comonomer residues;
based on 100 mol % of carboxylic acid component residues and 100 mol % of hydroxyl component residues in the polyester; wherein the molar ratio of the hydroxyl comonomer residues to diethylene glycol residues is 1.3:1.0 or greater; and wherein the polyester comprises less than 2.3 mol % of diethylene glycol and has an intrinsic viscosity greater than 0.40 dL/g and less than 0.80 dL/g.

In another embodiment, the present invention provides a polyester comprising:
 i) a carboxylic acid component comprising at least 90 mol % terephthalic acid residues and from 0 to 10 mol % of carboxylic acid comonomer residues;
 ii) a hydroxyl component comprising at least 90% ethylene glycol residues and the remainder diethylene glycol residues;
based on 100 mol % of carboxylic acid component residues and 100 mol % of hydroxyl component residues in the polyester; wherein the molar ratio of the carboxylic acid comonomer residues to diethylene glycol residues is 1.3:1.0 or greater; and wherein the polyester comprises less than 2.3 mol % of diethylene glycol and has an intrinsic viscosity greater than 0.40 dL/g and less than 0.77 dL/g. In another embodiment, the hydroxyl component comprises at least 98.0 mol % ethylene glycol residues and 2.0 mol % or less of diethylene glycol residues. In another embodiment, the hydroxyl component comprises at least 98.4 mol % ethylene glycol residues and 1.6 mol % or less of diethylene glycol residues. In other embodiments, the hydroxyl component comprises from 0.5 to 2.3 mol % of diethylene glycol residues, or from 0.5 to 2.0 mol % of diethylene glycol residues, or from 0.5 to 1.6 mol % of diethylene glycol residues.

Typically, polyesters such as polyethylene terephthalate are made by reacting a diol such as ethylene glycol with a dicarboxylic acid as the free acid or its dimethyl ester to produce an ester monomer or oligomers (esterification), which are then polycondensed to produce the polyester. More than one type of dicarboxylic residue can be used in the esterification reaction and the totality of carboxylic acid residues forms the carboxylic acid component of the polyester. Similarly, the totality of diol residues forms the hydroxyl component of the polyester.

In the polyesters of the invention, the carboxylic acid component comprises at least 90 mol % terephthalic acid residues, which can be supplied by terephthalic acid or by other terephthalic acid derivatives, such as, for example, ($C_1$-$C_4$) dialkyl esters of terephthalic acid. The mole percent of all the compounds containing at least one carboxylic acid group or derivatives thereof that are in the product polyester add up to 100%. In the polymers of the invention, the balance of carboxylic acid residues, aside from terephthalic acid residues, are carboxylic acid comonomer residues (from 0 to 10 mol %).

In the polyesters of the invention, the hydroxyl component comprises at least 90 mol % ethylene glycol residues and additional hydroxyl residues in an amount up to 10 mol %. The mole percent of all the compounds containing hydroxyl group(s) or derivatives thereof that become part of the product adds up to 100%. The mole percent of the hydroxyl residues and carboxylic acid residues in a product can be determined by proton NMR.

The reaction of the carboxylic acid component with the hydroxyl component during the preparation of the polyester polymer is not restricted to the stated stoichiometric mole percentages since one may utilize a large excess of the hydroxyl component if desired, e.g., on the order of up to 200 mole % relative to the 100 mole % of carboxylic acid component used. The polyester polymer made by the reaction will, however, contain the stated amounts of dicarboxylic acid residues and diol residues.

As mentioned previously, the carboxylic acid component of the polyesters of the invention can also include one or more additional carboxylic acid comonomers. Examples of compounds that can provide carboxylic acid comonomer residues include mono-carboxylic acid compounds, dicarboxylic acid compounds, and compounds with a higher number of carboxylic acid groups. Examples include aromatic dicarboxylic acids, for instance those having 8 to 14 carbon atoms; aliphatic dicarboxylic acids, for instance those having 4 to 12 carbon atoms; or cycloaliphatic dicarboxylic acids, for instance those having 8 to 12 carbon atoms. More specific examples of modifier dicarboxylic acids include phthalic acid; isophthalic acid; derivatives of isophthalic acid such as, for example, ($C_1$-$C_4$) dialkyl esters of isophthalic acid; naphthalene-2,6-dicarboxylic acid; derivatives of naphthalene-2,6-dicarboxylic acid such as, for example, ($C_1$-$C_4$) dialkyl esters of naphthalene 2-6-dicarboxylic acid; cyclohexanedicarboxylic acid; cyclohexanediacetic acid; diphenyl-4,4'-dicarboxylic acid; succinic acid; glutaric acid; adipic acid; azelaic acid; and sebacic acid; and the like. In one embodiment, isophthalic acid, naphthalene-2,6-dicarboxylic acid, or cyclohexanedicarboxylic acid are used as carboxylic acid comonomers. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester. In one embodiment of the invention, the carboxylic acid comonomers are chosen from isophthalic acid and naphthalene-2,6-dicarboxylic acid.

In addition to ethylene glycol and diethylene glycol, the hydroxyl component of the present polyester may include additional mono-ols, diols, or residues with a higher number of hydroxyl groups. Examples of compounds that can provide hydroxyl residues include cycloaliphatic diols, for instance those having 6 to 20 carbon atoms or aliphatic diols, for instance those having 3 to 20 carbon atoms. More specific examples of such diols include triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; or 2,2-bis-(4-hydroxypropoxyphenyl)-propane. In one embodiment of the invention, the hydroxyl comonomer is cyclohexanedimethanol.

In one embodiment, the carboxylic acid component of the polyesters of the invention comprises from 0 to 10 mol % of carboxylic acid comonomer, for example from 1 to 10 mol % of carboxylic acid comonomer. The polyesters can also comprise from 3 to 10 mol % of carboxylic acid comonomer or from 5 to 10 mol % of carboxylic acid comonomer. In another embodiment, the hydroxyl component of the polyesters of the invention comprises from 1 to 10 mol % of additional hydroxyl residues. The polyesters can also comprise from 3 to 10 mol % of additional hydroxyl residues or from 5 to 10 mol % of additional hydroxyl residues. In another embodiment, if isophthalic acid residues are used as comonomer residues, the hydroxyl component comprises a hydroxyl comonomer.

The polyesters of the present invention typically contain a lower mole percent of diethylene glycol (DEG) than many other polyesters used in similar applications. Any method suitable for reducing DEG content of polyester can be employed in the present invention. Suitable methods include reducing the mole ratio of diacid or diester relative to ethylene glycol in the esterification or transesterification reaction; reducing the temperature of the esterification or transesterification reaction, addition of DEG-suppressing additives, including tetra-alkyl ammonium salts and the like; and reduction of the DEG content of the ethylene glycol that is recycled back to the esterification or transesterification reaction.

In certain embodiments, the polyesters of the invention comprise less than 2.0 mol % of diethylene glycol or less than 1.6 mol % of diethylene glycol. The minimization of the DEG content allows for substitution with comonomers that could be more effective in retarding the crystallization rate or provide other beneficial characteristic to the polyester. In this manner, the total amount of comonomer modification employed can be reduced.

We have found that an appropriate molar ratio of the total comonomer residues to diethylene glycol residues in the polyesters of the invention is 1.3:1.0 or greater. In another embodiment, the molar ratio of the total comonomer residues to diethylene glycol residues in the polyesters of the invention is 1.5:1.0 or greater, for example, 1.9:1.0 or greater. In other embodiments, the mole percent of the diethylene glycol residues plus the mole percent of the total comonomer residues is greater than 4.0%; greater than 5.0%, or greater than 5.5%, or even greater than 6.0%.

We have found that minimizing the DEG content and maintaining the molar ratios of comonomer to DEG mentioned above allows a reduction in the pellet intrinsic viscosity while maintaining desirable natural stretch ratio and container physical properties. A reduction in the pellet inherent viscosity is valuable in a number of ways. A lower viscosity resin will fill the injection mold more easily, leading to a reduction in injection molding cycle time and an increase in product output. Also, a lower viscosity resin will reduce the injection pressure required to fill the mold in a given time, reducing the wear and tear on the injection molding machine. Therefore, manufacturing costs may be reduced for resins with a lower intrinsic viscosity.

Accordingly, the intrinsic viscosity of the polyesters of the invention can be less than 0.80 dL/g. For example, the intrinsic viscosity of the polyester particles can be less than 0.79 dL/g, less than 0.78 dL/g, or less than 0.77 dL/g, and even less than 0.76 dL/g. In another embodiment, the polyesters of the invention have an intrinsic viscosity greater than or equal to 0.40 dL/g. However, polyesters with intrinsic viscosities lower than 0.65 dL/g may not be suitable for the preparation of some beverage containers. The appropriate intrinsic viscosity can be chosen to best fit the application for which the polyester is to be used. Accordingly, in one embodiment, the polyesters of the invention have an intrinsic viscosity greater than or equal to 0.65 dL/g. In another embodiment of the invention, the polyesters have an intrinsic viscosity greater than or equal to 0.69 dL/g. Suitable intrinsic viscosities for the polyesters of the invention can be achieved by appropriate manipulation of the molecular weight of the polyester polymer chains.

Polyesters with intrinsic viscosities falling within a range defined by any two intrinsic viscosity values recited in the instant application are also within the scope of the present invention. For example, a polyester can have an intrinsic viscosity between 0.65 dL/g and 0.78 dL/g; or between 0.76 dL/g and 0.80 dL/g; or between 0.65 dL/g and 0.69 dL/g; etc.

During the molding or extrusion processes, acetaldehyde is formed by thermal decomposition of the polyester. When the polyester is formed into an article, the acetaldehyde in the article walls could migrate into the contents of the article. Small amounts of acetaldehyde adversely affect the flavor retaining property of foods and beverages, and the fragrance retaining property of foods, beverages, cosmetics, and other package contents. For these reasons, it is desirable to minimize the migration of acetaldehyde into package contents.

Therefore, in one embodiment, the polyesters of the invention contain less than 5 ppm residual acetaldehyde (as measured by the French National Standard Test). In another embodiment, the polyesters contain less than 2 ppm residual acetaldehyde or even less than 1 ppm residual acetaldehyde.

Acetaldehyde content can be successfully reduced in crystalline PET compositions by solid state polymerization. Solid state polymerization of PET polymers not only decreases its acetaldehyde content but also decreases its tendency to form acetaldehyde. Additionally, polyamides or other acetaldehyde scavengers known in the art can be used to reduce the level of acetaldehyde to an acceptable range.

The polyesters of the invention may be made by melting post consumer recycled polyester polymer. However, the molecular weight of bulk recycled polyester polymers can vary widely depending on their source or their service requirement. Therefore, it is desirable to use at least 75 wt % virgin polyester polymer when recycled polyester polymers are employed. In general, a virgin polyester polymer is made without post consumer recycled polymers, but it may optionally contain scrap or regrind polymers.

The polyesters of the invention can be made by a number of processes well known in the art. For example, the polyesters can be produced by melt phase polymerization. If the polymers are to be used to make plastic containers, polymerization is carried our to a molecular weight suitable for said container applications, for example by producing polymers having an intrinsic viscosity of at least 0.65 dL/g. Melt phase polymerization can be followed by process steps comprising, in no particular order, formation of particles, such as pellets, crystallization, and optionally removal of most of the residual acetaldehyde.

Various methods can be used for solidifying the polyester polymer after melt phase polymerization. For example, molten polyester polymer from the melt phase may be directed through a die, or merely cut, or both directed through a die followed by cutting the molten polymer. A gear pump may be used to drive the molten polyester polymer through the die. However, instead of using a gear pump, the molten polyester polymer may be fed into a single or twin screw extruder and extruded through a die, optionally at a temperature of 190° C. or more at the extruder nozzle. Once through the die, the polyester polymer can be drawn into strands, contacted with a cool fluid, and cut into pellets, or the polymer can be pelletized at the die head, optionally underwater. The polyester polymer melt may be optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers.

The polyesters of the invention can also be made by using solid state polymerization after melt polymerization. Crystalline PET can be solid stated since crystalline PET has a well defined melting point. In contrast, noncrystalline or amorphous copolyesters cannot be solid stated since such copolyesters lack a definite crystal structure and a well defined melting point and thus melt during the solid stating process forming large agglomerates. Therefore, if the length of the chain is going to be increased by solid state polymerization in the polyesters of the invention, the polyesters can be crystallized before hand.

Various methods and apparatuses can be used to crystallize the polyesters of the invention. For example, the polyesters can be thermally crystallized in a gas or a liquid. The crystallization may occur in a mechanically agitated vessel, a fluidized bed, a bed agitated by fluid movement, or in an unagitated vessel or pipe. The polyesters can also be crystallized in a liquid medium above the glass transition temperature of the polyester, typically between 140° C. and 180° C. The polyesters may also be strain crystallized.

Typically, the polyester is crystallized to at least a 15% degree of crystallization. Higher crystallization degrees can also be used, for example at least 25%, or at least 30%, or at least 35%, or at least 40%. The polyesters of the invention can be crystallized either before or after the formation of pellets.

Once crystallized pellets are obtained, they can be transported to a machine for melt processing into the desired shape, such as fibers, sheets for thermoforming into trays, or preforms suitable for stretch blow molding into beverage or food containers. Examples of beverage containers include containers such as bottles having a volume of 3 liters or less, suitable for hot fill, carbonated soft drinks, or water.

The present invention also provides a process for making a polyester container, for example a preform or a beverage bottle, comprising feeding crystallized polyester particles or pellets of the invention to an extrusion zone, melting the particles in the extrusion zone to form a molten polyester polymer composition, and forming a sheet or a molded part from extruded molten polyester polymer. The particles fed to the extrusion zone are normally dried and typically have sufficient crystallinity to prevent them from sticking to each other or to equipment during drying at a temperature ranging from 140° C. to 180° C. Moreover, the crystallized polyester particles fed to the extrusion zone after drying can contain low levels of residual acetaldehyde (as measured by the French National Standard Test), such as 10 ppm or less, 5 ppm or less, 2 ppm or less, or even 1 ppm or less. The sheet or molded part can be further processed to make thermoformed or blowmolded containers.

The present invention also provides a polymer blend comprising a polyester of the invention and one or more additional polymers, such as polyalkylene terephthalates and polyalkylene naphthalates, along with other thermoplastic polymers such as polycarbonate and polyamides.

The present invention also provides a composition comprising the polyester of the invention and one or more additives. Additives can be added to the melt phase or to the polyester to enhance its performance properties. For example, one or more of the following compounds can be used as additives in the polyesters of the invention: colorants, pigments, glass fibers, crystallization aids, impact modifiers, surface lubricants, denesting agents, stabilizers, antioxidants, ultraviolet light absorbing agents, metal deactivators, nucleating agents, acetaldehyde lowering compounds, flame retardants, recycling release aids, oxygen scavenging materials, platelet particles, reheat rate enhancing aids such as elemental antimony or reduced antimony or reducing agents to form such species in situ, silicon carbide, carbon black, graphite, activated carbon, titanium nitride, black iron oxide, red iron oxide and the like, sticky bottle additives such as talc, and fillers and the like. The resin may also contain small amounts of branching agents such as trifunctional or tetrafunctional carboxylic acids or their derivatives or alcohols such as trimellitic anhydride, trimethylol propane, pyromellitic dianhydride, pentaerythritol, and other polyester forming polyacids or polyols generally known in the art.

In addition to being used to manufacture containers (e.g., bottles), the polyesters of the invention can be also be used to make sheets, films, trays, rods, tubes, lids, fibers, filaments (such as bulk continuous filaments), other injection molded articles, and any other appropriate molded, extruded, or thermoformed article.

Beverage bottles made from polyethylene terephthalate suitable for holding water or carbonated beverages, and heat set beverage bottles suitable for holding beverages that are hot filled into the bottle, are examples of the types of bottles that can be made from the crystallized pellet of the invention.

The following examples are presented to further illustrate certain aspects of the polyesters and methods disclosed herein. However, these examples are not to be considered as limiting the invention.

EXAMPLES

Example 1 (Comparative)

A polyester was prepared comprising terephthalic acid residues and ethylene glycol residues with about 3.09 mol % of cyclohexane dimethanol residues and about 3.38 mol % (1.83 wt %) of diethylene glycol residues. The inherent viscosity of the polyester was about 0.725 dL/g. The inherent viscosity was measured at 25° C. using 0.5 grams of polymer per 100 mL of a solvent consisting of 60% by weight phenol and 40% by weight of tetrachloroethane. The intrinsic viscosity corresponding to this inherent viscosity is about 0.762 dL/g. The ratio (on a mol % basis) of cyclohexane dimethanol to diethylene glycol was about 0.91:1.0.

Example 2

A polyester was prepared in the same manner as in Comparative Example 1 comprising terephthalic acid residues and ethylene glycol residues with about 3.80 mol % of cyclohexane dimethanol residues and about 2.0 mol % (1.08 wt %) of diethylene glycol residues. The inherent viscosity of the polyester was about 0.724 dL/g and the corresponding intrinsic viscosity value was about 0.761 dL/g. The ratio (on a mol % basis) of cyclohexane dimethanol to diethylene glycol was about 1.90:1.0.

Example 3

A polyester was prepared in the same manner as in Comparative Example 1 comprising terephthalic acid residues and ethylene glycol residues with about 3.76 mol % of cyclohexane dimethanol residues and about 2.02 mol % (1.09 wt %) of diethylene glycol residues. The inherent viscosity of the polyester was about 0.718 dL/g and the corresponding intrinsic viscosity value was about 0.754 dL/g. The ratio (on a mol % basis) of cyclohexane dimethanol to diethylene glycol was about 1.86:1.0.

Differential scanning calorimetry was used to evaluate the crystallization rate of the polyester resins. A scan rate of 20° C./min was employed. The temperature corresponding to the peak of the crystallization exotherm on the cooling scan was recorded.

Freeblow volume was used as a measurement of the natural stretch ratio of the polymer. The freeblow test was performed on 54 g 2 L preforms, soaked in boiling water for 180 s prior to the application of about 70 psig air for about 60 s. The resulting freeblow bottles were filled with water, capped, and weighed. The weight of the preform and the cap were subtracted, and the resulting net weight was converted to volume using an assumed density of water of 1 g/cc. The reported results are averages of 24 measurements.

The fill time was recorded for the injection molding of the resins on a Husky LX160 injection molding machine with an 8 cavity injection mold making 24.6 g preforms. The barrel temperature setpoints were 280° C. with a transition to hold on position at 20 mm. The fill speed was 80% and the fill pressure was 33%. Fill times were recorded from machine output on the control panel display. The reported results are averages of 19 measurements.

The peak fill pressure was recorded for the injection molding of the resins on a Husky LX160 injection molding machine with an 8 cavity injection mold making 24.6 g preforms. The barrel temperature setpoints were 280° C. with a transition to hold on position at 20 mm. The fill speed was 33% and the fill pressure was 60%. Peak fill pressures were recorded from observation of machine output on the control panel display. The reported results are averages of 19 measurements.

TABLE 1

| Material | Tcc (° C.) | Freeblow Volume (cc) | Fill time (s) | Peak fill pressure (psi) |
| --- | --- | --- | --- | --- |
| Comparative Example 1 | 151 | 3247 | 1.97 | 226.6 |
| Example 2 | 153 | 2958 | 2.00 | 228.9 |
| Example 3 | 151 | 3087 | 1.98 | 220.5 |

The fill time result for Comparative Example 1 is inconsistent with the other data and is thought to have been influenced by excessive moisture accumulated on the pellets after drying and before injection molding. Preforms were not retained, thus intrinsic viscosity measurements to validate this theory were not possible.

The compositions of Examples 2 and 3 were chosen to yield very similar crystallization behavior to that of the composition of Comparative Example 1. However, the composition of Example 2 led to a decrease in the natural stretch ratio, as measured by freeblow volume, relative to that of Comparative Example 1. As demonstrated in Example 3, a reduction in the intrinsic viscosity mitigated the impact of the composition change on the freeblow volume, and led to demonstrated improvements in the injection molding fill time or reduction in the peak fill pressure during injection molding. Further reduction of the intrinsic viscosity can lead to more pronounced benefits in reduced fill time or reduced peak fill pressure, while yielding a material of similar stretching characteristics to the composition of Comparative Example 1. In one embodiment of the invention, the lower the DEG content of the polyester, the higher the reduction in intrinsic viscosity that can be achieved, while maintaining favorable stretching characteristics for use in conventional water bottle preform designs.

Currently, for state of the art injection molding machines making preforms for water bottles, a 0.02 s reduction in fill time would be worth on the order of $38,000 per machine per year.

Example 4 (Comparative)

A polyester was prepared comprising terephthalic acid residues and ethylene glycol residues with about 12 mol % of cyclohexane dimethanol residues and about 2.7 mol % (1.5 wt %) of diethylene glycol residues. The inherent viscosity of the polyester was about 0.691 dL/g and the corresponding intrinsic viscosity value was about 0.725 dL/g. The ratio (on a mol % basis) of cyclohexane dimethanol to diethylene glycol was about 4.44:1.0.

Example 5 (Comparative)

A polyester was prepared comprising terephthalic acid residues and ethylene glycol residues with about 31 mol % of cyclohexane dimethanol residues and about 2.7 mol % (1.5 wt %) of diethylene glycol residues. The inherent viscosity of the polyester was about 0.755 dL/g and the corresponding intrinsic viscosity value was about 0.796 dL/g. The ratio (on a mol % basis) of cyclohexane dimethanol to diethylene glycol was about 11.48:1.0.

TABLE 2

| Material | Tcc (° C.) | Freeblow Volume (cc) |
|---|---|---|
| Comparative Example 4 | 157 | Not able to blow without tearing |
| Comparative Example 5 | Not detectable | Not able to blow without tearing |

The polyesters compositions of Comparative Examples 4 and 5 with greater than 10 mol % modification were not able to be successfully blown into freeblow shapes, indicating a lack of strain hardening. These compositions are not suitable for the stretch blow molding process used when making containers with the materials of the present invention.

We claim:
1. A polyester comprising:
   i) a carboxylic acid component comprising at least 90 mol % terephthalic acid residues and from 0 to 10 mol % of carboxylic acid comonomer residues, wherein the carboxylic acid comonomer is selected from the group consisting of phthalic acid, isophthalic acid, a ($C_1$-$C_4$) dialkyl ester of isophthalic acid, naphthalene-2,6-dicarboxylic acid, a ($C_1$-$C_4$) dialkyl ester of naphthalene-2-6-dicarboxylic acid, cyclohexanedicarboxylic acid, cyclohexanediacetic acid, diphenyl-4,4'-dicarboxylic acid, succinic acid, glutaric acid, adipic acid, azelaic acid, and sebacic acid;
   ii) a hydroxyl component comprising at least 90 mol % ethylene glycol residues and additional hydroxyl residues in an amount of 1-10 mol %; wherein the additional hydroxyl residues comprise mixtures of diethylene glycol residues and hydroxyl comonomer residues, wherein said hydroxyl comonomer residues comprise 1,4-cyclohexanedimethanol;
   based on 100 mol % of carboxylic acid component residues and 100 mol % of hydroxyl component residues in the polyester;
   wherein at least one of the carboxylic acid and hydroxyl components comprises comonomer residues, the molar ratio of the total comonomer 1,4-cyclohexanedimethanol residues to diethylene glycol residues being 1.3:1.0 or greater; and
   wherein the polyester comprises less than 2.3 mol % of diethylene glycol and has an intrinsic viscosity greater than 0.40 dL/g and less than 0.77 dL/g,
   wherein the polyester has a degree of crystallization of at least 15%, and
   wherein the polyester is in the form of pellets.

2. A polyester according to claim 1, wherein the carboxylic acid comonomer is selected from the group consisting of isophthalic acid and naphthalene 2-6-dicarboxylic acid.
3. A polyester according to claim 1, wherein the polyester comprises less than 2.0 mol % of diethylene glycol.
4. A polyester according to claim 3, wherein the polyester comprises less than 1.6 mol % of diethylene glycol.
5. A polyester according to claim 1, wherein the molar ratio of the total comonomer 1,4-cyclohexanedimethanol residues to diethylene glycol residues is 1.5:1.0 or greater.
6. A polyester according to claim 1, wherein the polyester is prepared from 75% wt or greater virgin raw materials.
7. A polyester according to claim 1, wherein the residual acetaldehyde content of the polyester is less than 2 ppm.
8. A polyester according to claim 7, wherein the residual acetaldehyde content of the polyester is less than 1 ppm.
9. A polyester according to claim 1, wherein the polyester has an intrinsic viscosity greater than 0.65 dL/g and less than 0.77 dL/g.
10. A polyester according to claim 1, wherein the polyester has an intrinsic viscosity greater than 0.65 dL/g and less than 0.76 dL/g.
11. A polyester according to claim 1, wherein the carboxylic acid component comprises from 1 to 10 mol % of carboxylic acid comonomer or the hydroxyl component comprises from 1 to 10 mol % of additional hydroxyl residues.
12. A polyester according to claim 11, wherein the carboxylic acid component comprises from 3 to 10 mol % of carboxylic acid comonomer or the hydroxyl component comprises from 3 to 10 mol % of additional hydroxyl residues.
13. A polyester according to claim 1,
   the molar ratio of the total comonomer 1,4-cyclohexanedimethanol residues to diethylene glycol residues is 1.5:1.0 or greater; and
   wherein the polyester comprises less than 1.6 mol % of diethylene glycol and has an intrinsic viscosity of less than 0.76 dL/g.
14. A process for producing a container comprising:
   feeding the polyester pellets of claim 1 to an extrusion zone;
   melting the polyester pellets;
   forming a sheet or molded part from the molten extruded polyester; and processing the sheet or molded part to make a container.
15. A polyester comprising:
   i) a carboxylic acid component comprising 100 mol % terephthalic acid residues;
   ii) a hydroxyl component comprising at least 90 and less than 95 mol % ethylene glycol residues and additional hydroxyl residues in an amount greater than 5 and up to 10 mol %; wherein the additional hydroxyl residues are diethylene glycol residues and hydroxyl comonomer residues;
   based on 100 mol % of carboxylic acid component residues and 100 mol % of hydroxyl component residues in the polyester;
   wherein the molar ratio of the hydroxyl comonomer residues to diethylene glycol residues is 1.3:1.0 or greater; and
   wherein the polyester comprises less than 2.3 mol % of diethylene glycol and has an intrinsic viscosity greater than 0.40 dL/g and less than 0.80 dL/g,
   wherein the polyester has a degree of crystallization of at least 15% %, and wherein the polyester is prepared from 75% wt or greater virgin raw materials and is in the form of pellets.

16. A polyester according to claim 15, wherein the hydroxyl comonomer is selected from the group consisting of triethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2,5-ethylhexanediol-(1,3), 2,2-diethyl propane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane.

17. A polyester according to claim 16, wherein the hydroxyl comonomer is cyclohexane dimethanol.

18. A polyester according to claim 15, wherein the polyester comprises less than 2.0 mol % of diethylene glycol.

19. A polyester according to claim 18, wherein the polyester comprises less than 1.6 mol % of diethylene glycol.

20. A polyester according to claim 15, wherein the molar ratio of the hydroxyl comonomer residues to diethylene glycol residues is 1.5:1.0 or greater.

21. A polyester according to claim 15, wherein the acetaldehyde content of the polyester is less than 2 ppm.

22. A polyester according to claim 21, wherein the acetaldehyde content of the polyester is less than 1 ppm.

23. A polyester according to claim 15, wherein the polyester has an intrinsic viscosity greater than 0.65 dL/g and less than 0.78 dL/g.

24. A polyester according to claim 15, wherein the polyester has an intrinsic viscosity greater than 0.65 dL/g and less than 0.76 dL/g.

25. A polyester according to claim 15,
wherein the molar ratio of the hydroxyl comonomer residues to diethylene glycol residues is 1.5:1.0 or greater; and
wherein the polyester comprises less than 1.6 mol % of diethylene glycol and has an intrinsic viscosity of less than 0.76 dL/g.

26. A process for producing a container comprising:
feeding the polyester pellets of in claim 15 to an extrusion zone;
melting the polyester pellets zone;
forming a sheet or molded part from the molten extruded polyester; and
processing the sheet or molded part to make a container.

27. A polyester according to claim 1, wherein said carboxylic acid comonomer residues comprise isophthalic acid and/or naphthalene-2-6-dicarboxylic acid.

28. The polyester of claim 1, wherein the polyester has a degree of crystallization of at least 35% zone.

29. The polyester of claim 1, wherein the polyester has a degree of crystallization of at least 40%.

30. The polyester of claim 15, wherein the polyester has a degree of crystallization of at least 35%.

31. The polyester of claim 15, wherein the polyester has a degree of crystallization of at least 40%.

* * * * *